United States Patent
Singh et al.

(10) Patent No.: US 11,516,254 B2
(45) Date of Patent: Nov. 29, 2022

(54) CONTROLLING ACCESS TO MICROSERVICES WITHIN A MULTI-TENANCY FRAMEWORK

(71) Applicant: Juniper Networks, Inc., Sunnyvale, CA (US)

(72) Inventors: Gurminder Singh, Union City, CA (US); Pei-Yu Yang, Saratoga, CA (US); Rong Xie, Milpitas, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 154 days.

(21) Appl. No.: 16/447,733

(22) Filed: Jun. 20, 2019

(65) Prior Publication Data
US 2020/0404021 A1   Dec. 24, 2020

(51) Int. Cl.
*H04L 29/06* (2006.01)
*H04L 9/40* (2022.01)

(52) U.S. Cl.
CPC ............ *H04L 63/20* (2013.01); *H04L 63/104* (2013.01)

(58) Field of Classification Search
CPC ....... H04L 63/20; H04L 63/104; H04L 63/08; H04L 63/105; H04L 63/101; H04W 12/08
USPC .......................................................... 726/1
See application file for complete search history.

(56) References Cited

U.S. PATENT DOCUMENTS

| | | | |
|---|---|---|---|
| 5,941,947 A * | 8/1999 | Brown ................... | G06Q 99/00 709/225 |
| 8,321,921 B1 | 11/2012 | Ahmed et al. | |
| 8,935,757 B2 | 1/2015 | Srinivasan et al. | |
| 9,690,948 B2 * | 6/2017 | Velasco .................. | H04L 69/329 |
| 9,774,586 B1 * | 9/2017 | Roche .................. | G06F 21/6218 |
| 10,044,723 B1 | 8/2018 | Fischer et al. | |
| 10,277,601 B1 * | 4/2019 | Higgins ................ | H04L 63/101 |
| 10,666,657 B1 | 5/2020 | Threlkeld | |
| 2005/0044398 A1 | 2/2005 | Ballinger et al. | |
| 2005/0289348 A1 | 12/2005 | Joy et al. | |
| 2011/0314520 A1 | 12/2011 | Olszewski et al. | |
| 2017/0262648 A1 | 9/2017 | Bhuiyan et al. | |

(Continued)

FOREIGN PATENT DOCUMENTS

CN    104255007 A    12/2014

OTHER PUBLICATIONS

Extended Search Report from counterpart European Application No. 19200339.0, dated Mar. 11, 2020, 7 pp.

(Continued)

*Primary Examiner* — Longbit Chai
(74) *Attorney, Agent, or Firm* — Shumaker & Sieffert, P.A.

(57) ABSTRACT

In some examples, a system includes a network managed by a service provider and configured to provide access to one or more objects to a set of tenants each having one or more users, the service provider and the set of tenants being part of a set of entities that form a hierarchy, and a controller having access to the network. The controller is configured to obtain data indicative of a set of parameters, where the data indicative of the set of parameters is associated with an owner entity of the set of entities, generate a rule which incorporates the set of parameters, where the rule enables the controller to control access to an object of the one or more objects, and add the rule to a rules database, wherein the rules database is accessible to the controller.

20 Claims, 4 Drawing Sheets

(56) References Cited

U.S. PATENT DOCUMENTS

2019/0188408 A1* 6/2019 Glik .................... G06F 21/6218

OTHER PUBLICATIONS

U.S. Appl. No. 16/235,739, filed Dec. 28, 2018, entitled "Creating Roles and Controlling Access Within a Computer Network".
U.S. Appl. No. 16/235,647, filed Dec. 28, 2018, entitled "Dynamic Provisioning of User Groups Within Computer Networks Based On User Attributes".
Office Action from U.S. Appl. No. 16/235,739, dated May 26, 2021, 13 pp.
Response to Office Action dated May 26, 2021 from U.S. Appl. No. 16/235,739, filed Aug. 25, 2021, 9 pp.
Response to Extended Search Report dated Mar. 11, 2020 from counterpart European Application No. 19200339.0, filed Jun. 23, 2021, 32 pp.
Final Office Action from U.S. Appl. No. 16/235,739, dated Dec. 1, 2021, 16 pp.
Advisory Action from U.S. Appl. No. 16/235,739, dated Feb. 16, 2022, 3 pp.
Office Action from U.S. Appl. No. 16/235,739, dated Mar. 29, 2022, 23 pp.
Response to Office Action dated Dec. 1, 2021, from U.S. Appl. No. 16/235,739, filed Jan. 18, 2022, 10 pp.
Notice of Intent to Grant and Text Intended to Grant from counterpart European Application No. 19200339.0 dated Apr. 7, 2022, 41 pp.
Notice of Intent to Grant and Text Intended to Grant from counterpart European Application No. 19200339.0 dated Sep. 7, 2022, 41 pp.
Notice of Allowance from U.S. Appl. No. 16/235,739 dated Jul. 27, 2022, 10 pp.
Response to Office Action dated Mar. 29, 2022 from U.S. Appl. No. 16/235,739, filed filed Jun. 29, 2022, 11 pp.

* cited by examiner

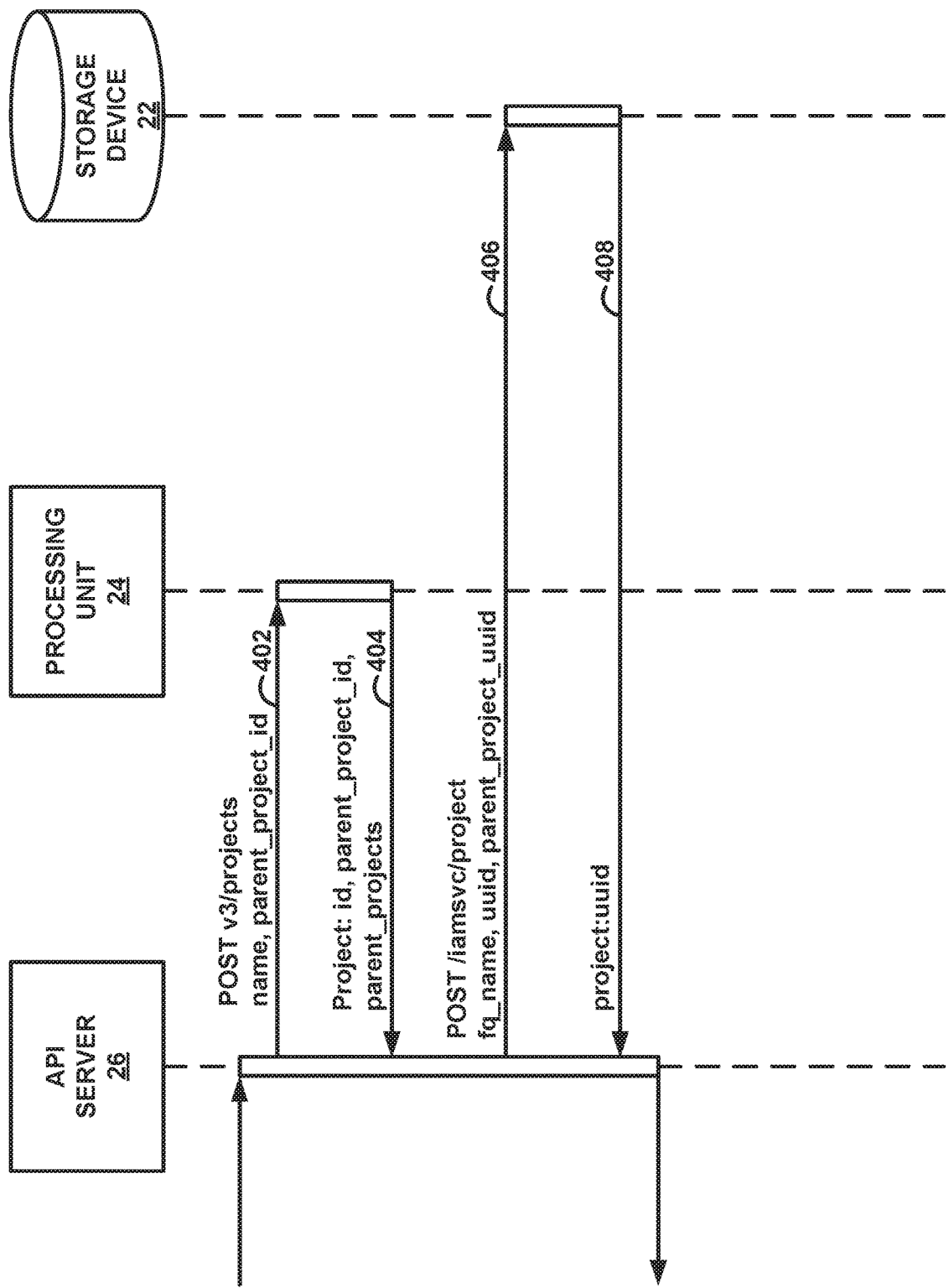

CONTROLLING ACCESS TO MICROSERVICES WITHIN A MULTI-TENANCY FRAMEWORK

TECHNICAL FIELD

The disclosure relates to computer networks.

BACKGROUND

A computer network is a collection of interconnected computing devices that can exchange data and share resources, and security policies associated with the network may restrict a user's ability to perform actions within the computer network. In some examples, the computer network may require usernames and passwords to access the network, and the computer network may track and restrict access to some objects and services of the computer network based on the username or other login credentials of a user.

Keystone is a component of the OpenStack™ open-source software platform for cloud computing. In general, Keystone is open-source software that enables authentication (authN) and high-level authorization (authZ) within a computer network. More specifically, Keystone supports token-based authN and user-service authorization. Keystone may track a specific user's actions within the computer network, and Keystone may additionally restrict the user's actions based on a "role" or a group of roles that the user is assigned to. Additionally, a specific action or privilege of a user within the computer network may be referred to as a "capability."

Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. Service providers may administer a computer network, and one or more applications within the service provider network may use Keystone to control services available to users of a plurality of tenants which interact with the computer network. In some cases, each tenant of the plurality of tenants may include one or more users of the computer network.

SUMMARY

In general, this disclosure is directed to devices, systems, and techniques for controlling access to objects (e.g., microservices, services, devices, systems, containers, and applications) within a multi-tenancy framework. For example, a network may include a service provider and a set of tenants, the service provider and the set of tenants included in a set of "entities" of a network. The set of entities may be organized in a hierarchy such that each entity of the set of entities is associated with at least one of a parent entity and one or more child entities of the set of entities. A controller may grant the set of entities access to objects based on one or more rules that are stored in a rules database. For example, to gain access to an object, an entity of the set of entities may send a service request to the controller, and the controller may grant or not grant the entity access to object based on the one or more rules stored in the rules database. In some cases, each object may be associated with a rule stored in the rules database, where the respective rule includes information indicative of entities that are permitted access to the object. In this way, the controller may determine whether an entity is granted access to an object based on the respective rule associated with the object.

In some examples, each entity of the set of entities may be configured to create an object and create a rule which governs access to the object within the network. An entity which creates an object may be referred to herein as the "owner" entity of the object. The owner entity may be associated with a parent entity and a set of child entities within the hierarchy. Additionally, the parent entity of the owner entity may be associated with another respective parent entity and another respective set of child entities. Each child entity of the set of child entities associated with the owner entity may, in some cases, be associated with another respective set of child entities. In this way, the hierarchy may be modelled as a "family tree," where some entities "descend" from other entities and some entities are "ancestors" of other entities. The hierarchy, in some examples, may serve as a vehicle for an owner entity to specify access to a respective object created by the owner entity. For example, the owner entity may send a message to the controller to create an object, specifying that the object is shared with at least one other entity of the set of entities. In some cases, the entity may specify that the object is to be shared with other entities based on the other entities' position within the hierarchy relative to the owner entity. In one example, the owner entity may specify that the object is to be shared with the parent entity of the owner entity. The controller may create a rule based on the indication provided by the owner entity and save the rule in the rules database.

The techniques of this disclosure may provide one or more advantages. For example, by enabling an owner entity to designate entities to be provided access to an object based on the other entities' position within the hierarchy relative to the owner entity, the controller may provide more granularity of control to the owner entity. In other words, the controller may enable the owner entity to specify very specific groups of entities to be permitted access to the object created by the controller entity, thus providing an efficient manner of controlling access to objects within the network.

In some examples, a system includes a network managed by a service provider and configured to provide access to one or more objects to a set of tenants each having one or more users, the service provider and the set of tenants being part of a set of entities that form a hierarchy, where each entity of the set of entities that form the hierarchy is associated with at least one of a parent entity of the set of entities and one or more child entities of the set of entities and a controller having access to the network. The controller is configured to obtain data indicative of a set of parameters, where the data indicative of the set of parameters is associated with an owner entity of the set of entities, generate a rule which incorporates the set of parameters, where the rule enables the controller to control access to an object of the one or more objects, and add the rule to a rules database, where the rules database is accessible to the controller.

In some examples, a method includes obtaining, by a controller having access to a network, data indicative of a set of parameters, where the network is managed by a service provider and configured to provide access to one or more objects to a set of tenants each having one or more users, the service provider and the set of tenants being part of a set of entities that form a hierarchy, where each entity of the set of entities that form the hierarchy is associated with at least one of a parent entity of the set of entities and one or more child entities of the set of entities, and where the data indicative of the set of parameters is associated with an owner entity of the set of entities. Additionally, the method includes generating a rule which incorporates the set of parameters, where the rule enables the controller to control access to an object of the one or more objects and adding the rule to a rules database, where the rules database is accessible to the controller.

In some examples, a non-transitory computer-readable medium including instructions for causing one or more processors to obtain data indicative of a set of parameters, where the network is managed by a service provider and configured to provide access to one or more Objects to a set of tenants each having one or more users, the service provider and the set of tenants being part of a set of entities that form a hierarchy, where each entity of the set of entities that form the hierarchy is associated with at least one of a parent entity of the set of entities and one or more child entities of the set of entities, and where the data indicative of the set of parameters is associated with an owner entity of the set of entities, generate a rule which incorporates the set of parameters, where the rule enables a controller to control access to an object of the one or more objects, and add the rule to a rules database, where the rules database is accessible to the controller.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 4 is a flow diagram illustrating an example operation for generating project corresponding to an entity of a set of entities, in accordance with one or more techniques of this disclosure.

DETAILED DESCRIPTION

Figure 1:
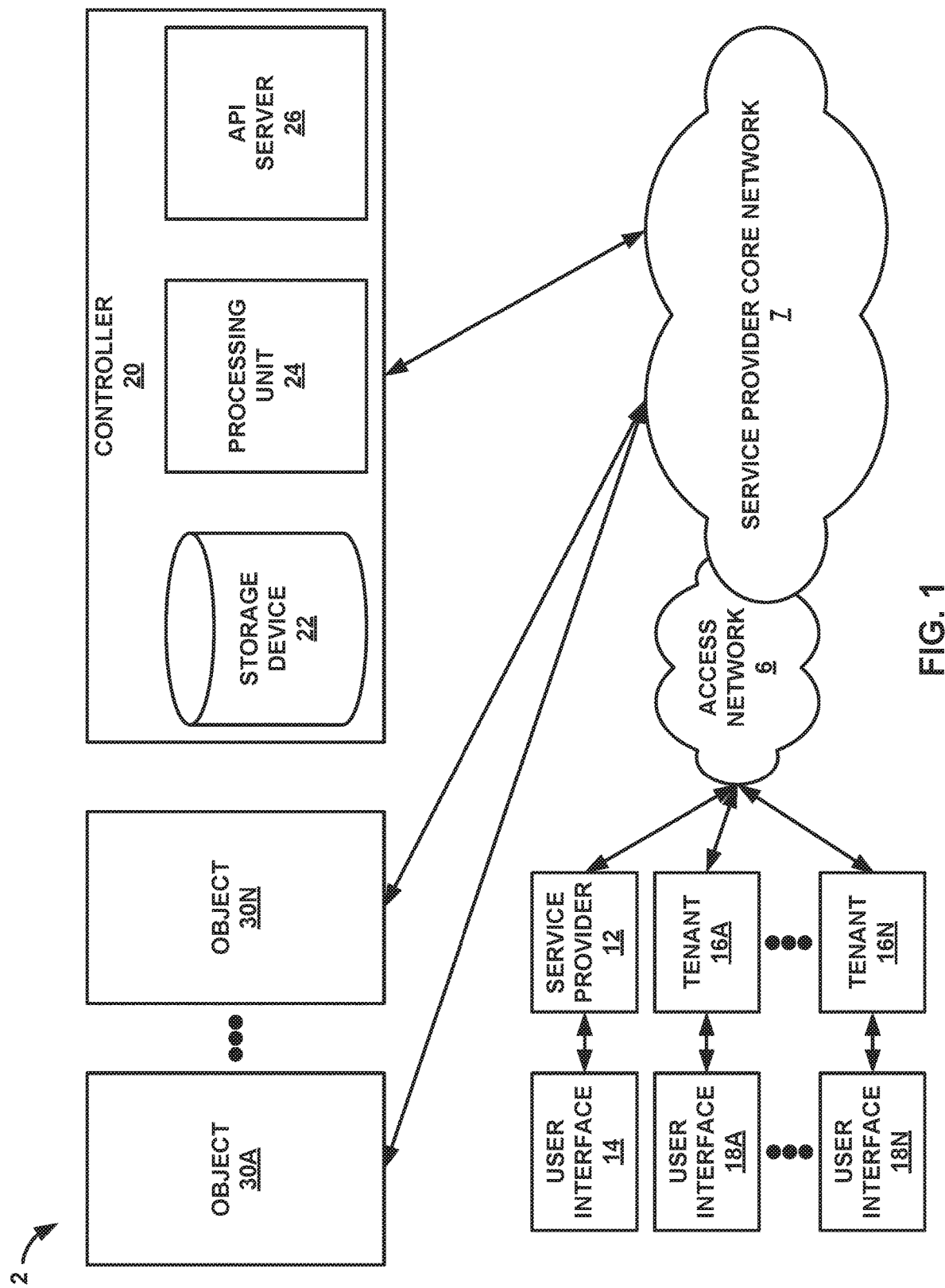
FIG. 1 illustrates an example network system, in accordance with one or more techniques described herein.

FIG. 1 illustrates an example network system, in accordance with one or more techniques described herein. The example network system of FIG. 1 includes a service provider network 2 administered by service provider 12 that provides microservices to service provider 12 and/or tenants 16A-16N (collectively, "tenants 16"). In this way, controller 25 may provide network services to "users" of service provider 12 and tenants 16 (collectively, "entities 12, 16"), That is, service provider network 2 provides authentication and establishment of network access for users of entities 12, 16 such that entities 12, 16 may gain access to objects 30A-30N (collectively, "objects 30"). In some examples, objects 30 may include data, sets of information, applications, devices, and/or systems, or any other item, thing, or concept that may be appropriate for use in accordance with one or more aspects of the present disclosure.

Although described with respect to service provider 12 operating a service provider network 2, service provider network 2 may in some examples represent an enterprise network managed by a large enterprise. Thus, references to a "service provider" or "provider" may similarly refer to an "enterprise manager," "network manager," or "operator." In addition, although described primarily with respect to "tenants" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, retailers, or any other entities that purchase, lease, or otherwise use services provided by service provider network 2.

In some examples, service provider network 2 implements a multi-tenancy framework for providing object-level access control corresponding to entities 12, 16. For example, controller 20 of service provider network 2 may maintain a set of rules corresponding to a set of objects 30, the set of rules governing a level of access of each of entities 12, 16 to objects 30. In some examples, service provider network 2 uses the Keystone identity service component within the OpenStack™ open-source software platform in order to facilitate provisioning object-level access control, Keystone is an open source software that provides identity access service. In some cases, it may be beneficial for service provider network 2 to build business-oriented access control services by leveraging Keystone, since Keystone is associated with well documented Application Programming Interfaces (APIs), strong community support, and a plugin-based architecture. In some cases, Keystone includes the following concepts: resources, identity, and role assignment.

In some examples, Keystone resources include domains and projects. A Keystone domain, in some cases, may be associated with one or more Keystone projects, and each Keystone project may be associated with another one or more Keystone projects. In this way, a Keystone domain and respective Keystone projects may form a hierarchy, where all Keystone projects "descend" from the Keystone domain. Additionally, the hierarchy may include a set of levels with the Keystone domain representing a first level of the hierarchy, a set of Keystone projects associated with the Keystone domain representing a second level of the hierarchy, and additional Keystone projects associated with each respective Keystone project of the set of Keystone projects representing a third level of the hierarchy, and so on. Keystone identity, in some cases, may include users and groups. A user may have a role in a Keystone project or the Keystone domain. A group may be a collection of resources associated with a particular user. Additionally, in Keystone, role assignment may be an association between resources and identities. For example, a role assignment may be an association between a user a project, thus enabling the user to access one or more objects of objects 30 that are available to the project.

Service provider network 2 may use fully qualified names to uniquely identify a resource, in some examples, a fully qualified name may include a resource collection path. In some examples, a device may be modeled under a project, where the project is modeled under a domain. The fully qualified name for such an example may be ['sp-domain', 'coke', 'device'], where 'sp-domain' represents a name of the domain, 'coke' represents a name of the project, and 'device' represents a name of the device. As such, the fully qualified name associated with the device may include parent-child relationships between projects and/or parent-child relationships between a domain and a project. Additionally, the fully qualified name may include a reference edge for performing an integrity check. The embedded information in the fully qualified name may be used in the multi-tenancy framework. In some examples, service provider network 2 may implement orchestration. "Orchestration," generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

In order to implement the Keystone identity service component within the OpenStack™ open-source software platform, service provider network 2 may organize entities 12, 16 as the hierarchy of domains and projects. For example, service provider 12 may be represented as a Keystone domain or a Keystone project. Additionally, each tenant of tenants 16 may be represented as a Keystone project. In this way, service provider 12 and tenants 16 may form a hierarchy.

Each of user interfaces 14 and 18A-18N (collectively, "user interfaces 14, 18") may be or may be part of a device or set of devices for interacting with and/or managing interactions, input, and/or output with one or more users. Accordingly, user interfaces 14, 18 may include any now-known or hereinafter developed device for such interactions (e.g., keyboard, pointing device, microphone(s), touchscreen device(s), buttons, keypads, lights, microphone(s) and/or audio speaker(s) for voice commands, responses, and/or other interactions, display device(s), touchscreen device(s), or any combination thereof. If included within a user interface of user interfaces 14,18, a display may include any combination of a liquid crystal display (LCD), light-emitting diodes (LEDs), or organic light-emitting diodes (OLEDs). In some examples the display may include a touch screen or other physical or direct interaction device. Each of user interfaces 14, 18 may correspond to (i.e., be accessible to or operated by) a user or a tenant of entities 12, 16. For example, user interface 14 may correspond to service provider 12, user interface 18A may correspond to tenant 16A, user interface 18B may correspond to tenant 16B, and user interface 18N may correspond to tenant 16N.

User interfaces 14, 18 may be configured to display or present information related to rules roles, capabilities, service provider 12, tenants 16, objects 30, or other information. User interfaces 14, 18 may, in some cases, receive user input. The user input may be, for example, in the form of a button pressed on a keypad or an icon selected from a touch screen. In some examples, user input to user interface 18A may include login credentials of a user associated with tenant 16A. Based on the login credentials, service provider network 2 may authenticate the user and generate an assertion indicating the user's authentication status and attributes associated with the user. The attributes, in some cases, may include information about tenants, roles, and access associated with the user.

In some examples, a computer program may contain objects designed to interact with one another. In this way, the services provided by service provider network 2 may include a plurality of objects, where at least some objects are configured with an API enabling interactions with other objects of the plurality of objects. Some of the objects of service provider network 2 may include representational state transfer (REST) application programming interfaces (APIs) that are RBAC controlled. As such, access to objects within service provider network 2 may be RBAC controlled. REST APIs may determine a user's access within service provider network 2. In some examples, RBAC may cause a navigation screen to be shown or to be hidden for a user based on capabilities that are associated with the user. In some examples, the REST APIs may be RBAC controlled such that a user has read-only access to a screen, but the user is not permitted to create an/or modify objects presented on the screen. In some examples, since a user interface layout may change over time or the REST APIs needed to display or present a user interface screen may change, a dynamic mapping of user interface capabilities to REST APIs may be beneficial.

In some examples, service provider network 2 may include a network that serves a business. At least some of tenants 16 may represent business units within the business, each business unit having a one or more employees. Each employee, in some cases, may represent a user. If a junior accounting employee of an accounting business unit logs in to a respective tenant associated with the accounting business unit (e.g., tenant 16A), the junior accounting employee may access service provider network 2 according to rules, privileges, and restrictions associated with the junior accounting employee. The rules, privileges, and restrictions may be manifested in a set of rules stored in storage device 22 of controller 20. For example, the junior accounting employee may be able to access privileged financial documents that are restricted for viewing and editing by the junior accounting employee. In some cases, a senior accounting employee associated with tenant 16A may be assigned to a different level of access than the junior accounting employee, affording the senior accounting employee privileges that the junior accounting employee is not granted. Moreover, if a design employee of a product development business unit logs in to a respective tenant associated with the product development business unit (e.g., tenant 16B), the design employee may be able to access documents including confidential design diagrams of a not-yet-released product. The junior accounting employee and the senior accounting employee might not have access to the design diagrams, for example.

In other examples, service provider network 2 may be managed by a service provider which offers a subscription-based program to customers. In such examples, users of tenants 16 may be customers of service provider network 2. Storage device 22 may include a set of rules that determine a level of access to objects 30 contracted for by such a customer (e.g., based on a user's agreement to pay the service provider in for subscribed services). For example, the set of rules may define a first set of access and a second set of access. The second level of access may, in some cases provide the second user greater access to service provider network 2 than the first level of access provides the first user if the second user subscribes to a higher level of service than the first user. Alternatively, or in addition, the second level of access, in some cases provide the second user with otherwise different access to or capabilities of service provider network 2 than the first level of access provides the first user if the second user subscribes to a different level of service than the first user.

In the example of FIG. 1, service provider network 2 includes access network 6 ("access network 6") that provides connectivity to controller 20 and objects 30 via service provider core network 7. Service provider core network 7 provides packet-based services that are available for request and use by service provider 12 and/or tenants 16. As examples, core network 7 may provide, for example, bulk data delivery, voice over Internet protocol (VoIP), Internet Protocol television (IPTV), Short Messaging Service (SMS), Wireless Application Protocol (WAP) service, customer-specific application services, or any other now-known or hereafter developed network-based service. Service provider core network 7 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, service provider core network 7 is connected to a public WAN, the Internet, or to other networks. In some examples, service provider core network 7 may execute one or more packet data protocols (PDPs), such as IP (IPv4 and/or IPv6), X.25 or Point-to-Point Protocol (PPP), to enable packet-based transport of services.

Access network 6 may include a portal to service provider network 2 which allows service provider 12 and/or tenants 16 to exchange information with service provider network 2. A user of service provider 12 may be an administrator of service provider network 2. A user of tenants 16 may be a subscriber who represents, for instance, an enterprise, a residential subscriber, or a mobile subscriber. Service provider 12 and tenants 16 connect to access network 6 via access links that include wired and/or wireless communication links. The term "communication link," as used herein, includes any form of transport medium, wired or wireless, and can include intermediate nodes such as network devices. Each of access links may include, for instance, aspects of an asymmetric DSL network, WiMAX, a T-1 line, an Integrated Service Digital Network (ISDN), wired Ethernet, or a cellular radio link.

A network service provider (e.g., service provider 12) may operate, or in some cases may lease, elements of access network 6 to enable objects 30 to provide services to service provider 12 and/or tenants 16. Access network 6 thus may represent a network that aggregates data traffic from one or more subscribers for transport to/from service provider core network 7 of the service provider. Access network 6 may include multiple "access" segments coupled to an aggregation segment and/or backhaul network owned or leased by the service provider. An access node of an access network couples to the customer premises equipment (CPE) to process subscriber packets at layer 2 (L2) or higher. Access nodes may include digital subscriber line access multiplexors (DSLAMs), MTUs, passive optical network (PON) optical line termination devices such as Reconfigurable Optical Add-Drop Multiplexer (ROADM) with microelectromechanical systems (MEMs) and Liquid Crystal on Silicon (LCoS), cell site gateways (CSGs), eNode Bs, LTE/GSM/UMTS controllers, and microwave as well as virtual Multiple-Input and Multiple-Output (MIMO) over distributed base stations. In the cable operator (Multiple System Operator (MSO)) domain, the Data Over Cable Service Interface Specification (DOCSIS) 3.x standards specify a means of channel bonding and dynamic frequency allocation. Broadband cable access network nodes may include Cable Modem Termination Systems (CMTS) and Cable Modems, e.g., as part of a Converged Cable Access Platform (CCAP) solution.

Access network 6 includes network nodes that execute communication protocols to transport control and user data to facilitate communication between any combination of service provider 12, tenants 16, controller 20, and objects 30. Access network 6 may include a broadband access network, network, a wireless LAN, a public switched telephone network (PSTN), or other type of access network, and may include or otherwise provide connectivity for cellular access networks, such as a radio access network (RAN). Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of access network 6 connect access nodes to border nodes that enable inter-region data transport. In some examples, border nodes include area border routers and autonomous system boundary routers (ASBRs). Border nodes (not shown) may couple access network 6 to core network 7.

Service provider core network 7 (hereinafter, "core network 7") offers connectivity to service provider 12 and tenants 16 attached to access network 6 for communicating with controller 20 and objects 30. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers.

Access network 6 and core network 7 may include service nodes that apply services to subscribers. Service node examples include L2 provider edge (PE) or L3 PE routers, broadband network gateway (BNGs), peeling routers, content servers, media gateways, base station controllers, and so forth. Illustrated gateway 8 includes an example of a service node.

A network service provider that administers at least parts of service provider network 2 typically offers services to subscribers associated with devices which access the service provider network. Services offered may include, for example, traditional Internet access, VoIP, video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

Controller 20, in one example, may include processing circuitry (not illustrated in FIG. 1) that is configured to implement functionality and/or process instructions for execution within service provider network 2. Controller 20 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry. In some examples, controller 20 generates a set of rules that govern access to at least one of objects 30A-30N (collectively, "objects 30"). Objects 30 may, in some cases, represent sets of data, applications, or sets of information that controller 20 manages access to. For example, controller 20 may control the access of entities 12, 16 to objects 30 according to the set of rules.

In the example illustrated in FIG. 1, controller 20 includes storage device 22, processing unit 24, and API server 26. Storage device 22 may be configured to store information within controller 20 during operation, Storage device 22 may include a computer-readable storage medium or computer-readable storage device. In some examples, storage device 22 includes one or more of a short-term memory or a long-term memory. Storage device 22 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 22 is used to store program instructions for execution by controller 20. Storage device 22 may be used by software or applications running on controller 20 to temporarily store information during program execution. Processing unit 24 may be configured to process data received or generated by controller 20.

API server 26 includes code executable by controller 20. API server 26 may be one or more computer processes. API server 26 validates and configures data for objects (e.g., objects 30), such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 26 may implement a Representational State Transfer (REST) interface to process REST operations and provide the frontend to a corresponding cluster's shared state stored to storage device 22. API server 26 may authenticate and authorize requests. API server 26 communicates with other components to instantiate virtual execution elements in service provider network 2. API server 26 may represent a Kubernetes API server.

In some examples, controller 20 may generate Kubernetes projects and/or Kubernetes domains representing each of entities 12, 16. For example, API server 26 may send a message to processing unit 24, the message including a name of a project to be generated, and an identification of a parent project of the project to be generated, where the parent project is one level "higher" in the hierarchy than the project to be generated. Subsequently, processing unit 24 may generate the project and output a message to API server 26, the message including an identification of the project generated by the processing unit 24 and an identification of the parent project. API server 26 may save the project to storage device 22, and storage device 22 may return a confirmation to API server 26 that the project is saved.

In some examples, a policy file may be pre-configured based on a service need. The pre-configuration of a policy file may include two parts: rule definition, and resource-rule association. During a micro-services startup phase, rules configured for each resource type will be loaded to a resource class, and it will be converted corresponding access detail and injected to a permissions structure during a resource creation phase. For example, objects 30 may represent resources. Controller 20 may control access to objects 30 based on rules stored in storage device 22, where a rule is associated with each object of objects 30. If a tenant (e.g., tenant 16A) wishes to access an object (e.g., object 30A), tenant 16A may send a Hypertext Transfer Protocol (HTTP) request to controller 20 requesting access to object 30A. In some examples, Controller 20A may evaluate the HTTP request to determine whether tenant 16A will be granted access to object 30A. For example, When HTTP requests represent resource manipulation requests, such as GET, PUT, DELETE, permissions of a target resources rule may be extracted out and evaluated based on user token information.

In some cases, controller 20 may determine whether: (1) a token project id matches an owner of a resource permission, (2) whether a token project scope is included in a list of shared project scopes, (3) whether a token project ID is in a list of shared projects, (4) whether the token project is a child project of an owner of the resource when the resource is shared with child projects (in some cases, a child project represents a first level descendant of the owner project in the domain/project hierarchy), (4) whether the Token project is a descendant project of the owner of the resource when the resource is shared with descendant projects (descendants projects includes all levels of descendant projects of the owner project), and (6) whether the resource is shared globally. In some examples, if there is a match in rule (1)-(6), depending on a request operation (i.e. GET/PUT/DELETE), an RWX configuration in the permissions will be evaluated. In some examples, permission may be granted if some or all checks are passed.

In some examples, controller 20 may execute one or more software or program modules that interact with, enhance, supplement, or perform tasks associated with authentication or related procedures provided by the Keystone open-source software program. In some examples, such software or program modules are implemented as a Keystone or other authentication service plug-in, and may be developed pursuant to an API for Keystone or a related or similar service.

In some examples, service provider network 2 is managed by service provider 12. For example, service provider network 2 is configured to provide access to one or more objects of objects 30 to tenants 16 each having one or more users. Service provider 12 and tenants 16 (entities 12, 16) may form a hierarchy, where each entity of entities 12, 16 that form the hierarchy is associated with at least one of a parent entity of entities 12, 16 and one or more child entities of entities 12, 16. Controller 20 may have access to service provider network Controller 20 may be configured to obtain data indicative of a set of parameters, where the data indicative of the set of parameters is associated with an owner entity of entities 12, 16 and generate a rule which incorporates the set of parameters, where the rule enables controller 20 to control access to an object (e.g., object 30A) of objects 30. In some examples, processing unit 24 may generate the rule. In this way, the rule generated by controller 20 may be associated with object 30A, the one or more parameters incorporated in the rule determining whether a respective tenant of tenants 16 is permitted to access object 30A. Controller 20 may add the rule to a rule database, where the rule database is stored in storage device 22 configured to communicate with processing unit 24.

The set of parameters which are obtained by controller 20 to create the rule associated with object 30A may include, for example, an indication of an owner entity of entities 12, 16 associated with the rule. In one example, tenant 16A may be the owner entity of object 30A. As such, tenant 16A may represent a creator of object 30A. Thus, the owner entity associated with object 30A may provide the set of parameters to controller 20 in order to influence the control of access to object 30A. Additionally, the set of parameters may include an indication of a level of access to object 30A available to the owner entity of object 30A, an indication to share object 30A corresponding to the rule with at least one subset of entities of entities 12, 16, and an indication of whether to share object 30A with all entities of entities 12, 16.

The "level of access" to object 30A available to the owner entity of object 30A which may be included in the set of parameters may, in some examples, represent Unix/Linux file permissions. For example, the indication of the level of access to object 30A available to the owner entity of object 30A includes an indication that the owner entity is permitted to read object 30A, an indication that the owner entity is permitted to write object 30A, an indication that the owner entity is permitted to execute object 30A, or any combination thereof. An indication that the owner entity is permitted to read object 30A enables the owner entity to view data associated with object 30A. An indication that the owner entity is permitted to write object 30A enables the owner entity to edit the data associated with object 30A. Additionally, an indication that the owner entity is permitted to execute object 30A enables the owner entity to receive a service associated with object 30A. Since the indication may include any one or combination of the read permission, the write permission, and the execute permission, the indication of the level of access may include an indication that the owner entity is permitted to read object 30A and write object 30A, an indication that the owner entity is permitted to read object 30A and execute object 30A, an indication that the owner entity is permitted to write object 30A and execute object 30A, or an indication that the owner entity is permitted to read object 30A, write object 30A, and execute object 30A. Additionally, the level of access may represent an indication that the owner entity is not permitted to read object 30A, write object 30A, and execute object 30A.

In some cases, the indication to share object 30A with at least one subset of entities of entities 12, 16 includes an indication to share object 30A with a subset of entities including a direct parent entity associated with the owner entity of object 30A, In some examples where the owner entity of object 30A is tenant 16A, a direct parent entity of tenant 16A is service provider 12. As such, an indication to share object 30A with a subset of entities including a direct parent entity associated with the owner entity of object 30A may be an indication to share object 30A with service provider 12, enabling service provider 12 to access object 30A. In some cases, the indication to share object 30A with at least one subset of entities of entities 12, 16 includes an indication to share object 30A with a subset of entities of entities 12, 16 including one or more direct child entities associated with the owner entity of object 30A. Direct child entities, in some examples, may be "first level" descendants of the owner entity in the hierarchy of entities 12, 16. Additionally, in some cases, the indication to share object 30A with at least one subset of entities of entities 12, 16 includes an indication to share object 30A with a subset of entities including all entities of entities 12, 16 that descend from the owner entity of object 30A in the hierarchy of entities 12, 16, including "first level" descendants of the owner entity and all descendants of the first level descendants of the owner entity. The indication to share object 30A with at least one subset of entities of entities 12, 16 may also include an indication to globally share object 30A, that is, share object 30A with all entities of entities 12, 16.

In some examples, each entity of entities 12, 16 is associated with a respective scope of a set of scopes. The indication to share object 30A with the at least one subset of entities of entities 12, 16 may, in some cases, include an indication to share object 30A with a subset of entities including all entities of the set of entities that are associated with a scope of the set of scopes.

Controller 20 may be configured to receive, from a requesting entity (e.g., tenant 16N) of entities 12, 16, a token requesting access to an object (e.g., object 30N) of objects 30, where the token includes data indicative of an identity of the requesting entity. Additionally, processing unit 24 may be configured to identify, in the rules database stored in storage device 22, the rule corresponding to object 30N. In other words, processing unit 24 may be configured to identify the rule that governs access to object 30N, the rule including an indication one or more entities that are permitted access to object 30N. In this way, processing unit 24 may be configured to determine, based on the set of parameters incorporated by the rule associated with object 30N and based on the identity of the requesting entity, whether the requesting entity is granted access to the object. Put another way, processing unit 24 may be configured to determine if tenant 16N is listed as an entity with access to object 30N based on the rule associated with object 30N. In some examples where the set of parameters indicated by the rule associated with object 30N includes an indication to share object 30N with at least one subset of entities of entities 12, 16, to determine whether tenant 16N is granted access to object 30N, processing unit 24 may be configured to determine that tenant 16N is granted access to object 30N if tenant 16M is included by the at least one subset of entities; or determine that tenant 16M is not granted access to object 30N if tenant 16M is not included by the at least one subset of entities.

Controller 20 may implement multi-tenancy policy syntax in order to generate, identify, and enforce rules stored in storage device 22. In some examples, multi-tenancy includes defining multi-tenancy rules and establishing relationships between rules and resources (e.g., objects 30) for a micro-service. Multi-tenancy rule syntax may include, for example, a rule definition (e.g., "r:owner_rwx") and a rule association (e.g., "customer": "r:owner_rwx"). A rule definition may include the syntax r:[rule_name], where "r:" corresponds to a parser for recognizing this rule. The syntax "rule_name" may be any string of characters defined by a creator of the rule, as long as you understand it. Each rule definition may include 4 items: (1) owner, (2) owner_access, (3) share, (4) global_access. Items (1)-(4) may correspond to the set of parameters included in the data obtained by, controller 20. As such, controller 20 may be configured to obtain an indication of an owner entity of an object, an indication of a level of access to object available to the owner entity, an indication to share the object with at least one subset of entities of entities 12, 16, and an indication of whether to share the object with all entities of entities 12, 16.

Controller 20 may obtain the indication of the owner entity in a variety of different ways. In some examples, a service provider user may log in to a project named 'sp,' where the ID of the project is 'sp111'. Subsequently, the service provider user may import a Pop. The ownership of the Pop will be the project IP 'sp111,' corresponding to the project that the service provider user is logged in to. In some examples, the service provider user may log in to the 'sp111' project at user interface 14 using any combination of a username, a password, biometric information, and other login information. Additionally, in some examples, a user may create a template, a device-profile, or a service-level agreement (SLA) profile object. Such objects may be modeled as a child under a project which is associated with the fully qualified name '[domain, project, objname].' The multi-tenancy framework (e.g., controller 20) may derive a UUID from the [domain, project] section of the fully qualified name, and associate the UUID as an owner of the respective object.

In some examples, if supplied with a permissions payload during an object POST/PUT, the owner may be accepted from the permissions. The multi-tenancy framework might not derive anything for permissions, and the multi-tenancy framework may customize access to the object. Additionally, in some examples, controller 20 may copy a value from the object's fully qualified project permissions. For example, in a micro-service where recourses are modeled in a 1-1 mapping, copying a value from the permissions may keep access to the object consistent between two resource types.

In some examples, an indication to share the object with at least one subset of entities of entities 12, 16 may include one or both of a reference share and a parent-child share. In the case of a reference share, the multi-tenancy framework may set up share access to an object being referenced. If having a use case where permissions are not enabled at the beginning, but are enabled only when certain actions happen, this option may apply to you. A reference share rule may have the following syntax: 'reference_resource_type: [reference_share_option, reference_share_access],' where 'reference_resource_type' is an object type 'object_type' modeled in Yet Another Next Generation (YANG). Additionally, 'reference_share_option' allows a value of [1, 2], where '1' limits sharing to certain project, and where '2' will change global share. In some examples, a level of access granted to entities may be referred to as 'share access,' where share access represents Unix RWX access. For example, in unix RWX access, '1' is x, '2' is w, '3' is xw, '4' is r, '5' is rx, '6' is rw, and '7' is rwx.

In some examples, to perform a reference share, service provider 12 creates a nfv-service-profile, preventing a customer from viewing the a nfv-service-profile until the a nfv-service-profile is assigned to the customer. For example, controller 20 may create a rule having the syntax: "r:share_to_a_customer": {"owner": 1, "owner_access": 7, "share": {"customer": [1, 5]}, global_access: 0}. In this way, the rule indicates that controller 20 may derive the identity of the owner entity from a token, the rule indicates that the owner access available to the owner entity is "RWX" (i.e., read, write, and execute), and the rule indicates that the object (e.g., the nfv-service-profile) is shared with the customer. Additionally, the rule indicates that the object is not shared globally. Controller 20 may associate the rule to nfv-service-profile using the following syntax: "nfv-service-profile": "r:share_to_a_customer". Additionally, in some examples, to perform a reference share, service provider 12 creates a nfv-service-profile as a private profile only visible to service provider 12. Service provider 12 may enable all customers to see the profile if service provider 12 drags the profile to global-nfv-service-profile. For example, controller 20 may create a rule having the syntax: "r:share_to_global": {"owner": 1, "owner_access": 7, "share": {"global-nfv-service-profile": [1, 5]}, global_access: 0}. In this way, the rule indicates that controller 20 may derive the identity of the owner entity from a token, the rule indicates that the owner access available to the owner entity is "RWX" (i.e., read, write, and execute), and the rule indicates that the object (e.g., the nfv-service-profile) is shared with all customers of service provider 12. Controller 20 may associate the rule to nfv-service-profile using the following syntax: "nfv-service-profile": "r:share_to_global".

In examples where parent-child share is used, the multi-tenancy framework may auto share objects 30 to parent projects, child projects, ancestor projects, descendant projects, or any combination thereof. In some cases, a parent-child share rule has the following syntax: parent_child_share_type: [parent_child_share_option, share_access]. Additionally, in some cases, a parent-child share rule has the following syntax: parent_child_share_type: supports value in [share.child_projects, share.parent_project, share.descendant_projects, share.parent_projects]. The parent child share option may include any one or more of: 'share.child_projects' which shares with first-level child projects, 'share.parent_project' which shares with the first-level parent project, 'share.descendant_projects,' which shares with all levels of descendant projects, 'share.parent_projects' which shares with all levels of ancestor projects, 'share.project_scope.sp' which shares with all tenants having service provider scope, 'share.project_scope.opco' which shares with all tenants having OpCo scope, and 'share.project_scope.enterprise' which shares with all tenants having enterprise scope. Additionally, 'share_access' represents unix RWX access where '1' is x, '2' is w, '3' is xw, '4' is r, '5' is rx, '6' is rw, and '7' is rwx.

In some cases, for the 'share.child_projects' option, only value '1' is permitted so that controller 20 does not distinguish different between child projects of the owner project and will apply the rule to all child projects. In some cases, for the 'share.parent_projects' option, any value of [1, 2, 4] is permitted, where '1' causes controller 20 to derive parent project information from a token, where '2' causes controller 20 to derive parent project information from the fully qualified name of the respective object, and where '4' causes controller 20 to fill in a default-project ID as parent project. In some examples, for the 'share.descendant_projects' option, only the value '1' is permitted so that controller 20 does not distinguish different between child projects of the owner project. In some cases, for the share.parent_projects' option, values '1,' and '2' are permitted, where '1' causes controller 20 to derive parent project information from a token and where '2' causes controller 20 to derive parent project information from the fully qualified name of the respective object.

In some examples, in a parent-child share, a service provider user creates a set of templates and shares the set of templates to tenants of the service provider (e.g., service provider 12 shares the set of templates with all of tenants 16), enabling the tenants to refer to the set of templates to create an abstract configuration and deploy the abstract configuration. In some such examples, controller 20 creates a rule associated with the set of templates. The rule may be defined as: "r:share_wIth_child_rx": {"owner": 2, "owner_access": 7, "share": {"share.child_projects": [1, 5]}, "global_access": 0}. As such, the rule indicates that controller 20 may derive the owner entity from the fully qualified name of the respective object (e.g., the set of templates), that the owner access available to the owner entity is "RWX" (i.e., read, write, and execute), and that the object is shared with first-generation child entities of the owner entity. As such, if the owner entity is service provider 12, the object may be shared with the child entities of service provider 12 (e.g., tenants 16A-16C). Additionally, the rule indicates that the object is not shared globally. Controller 20 may associate the rule with the object (e.g., "template,") using the following syntax: "template": "r:share_with_parent_r."

Additionally, in an example where a tenant user (e.g., a user of tenant 16A) creates a set of templates and shares the set of templates with service provider 12 so that service provider 12 may access a variable in the set of templates, controller 20 may generate a isle having the syntax: "r:share_ wIth_parent_r": {"owner": 2, "owner_access": 7, "share": {"share.parent_project": [1, 4]}, "global_access": 0}. As such, the rule indicates that controller 20 may derive the owner entity from the fully qualified name of the respective object (e.g., the set of templates), that the owner access available to the owner entity is "RWX" (i.e., read, write, and execute), and that the object is shared with the first-level parent entity of the owner entity. As such, if the owner entity is tenant 16A, the object (e.g., the set of templates) may be shared with the parent entity of tenant 16A (e.g., service provider 12).

Global access (syntax: "global_access"), in some examples, may determine if an object of objects 30 is shared globally (e.g., value '1') or not shared globally (e.g., value '0'). Unix RWX applies to global access. The multi-tenancy permission may affect a LIST API for HTTP resource requests. By default, the LIST API may list out all resources visible to the requester.

Figure 2:
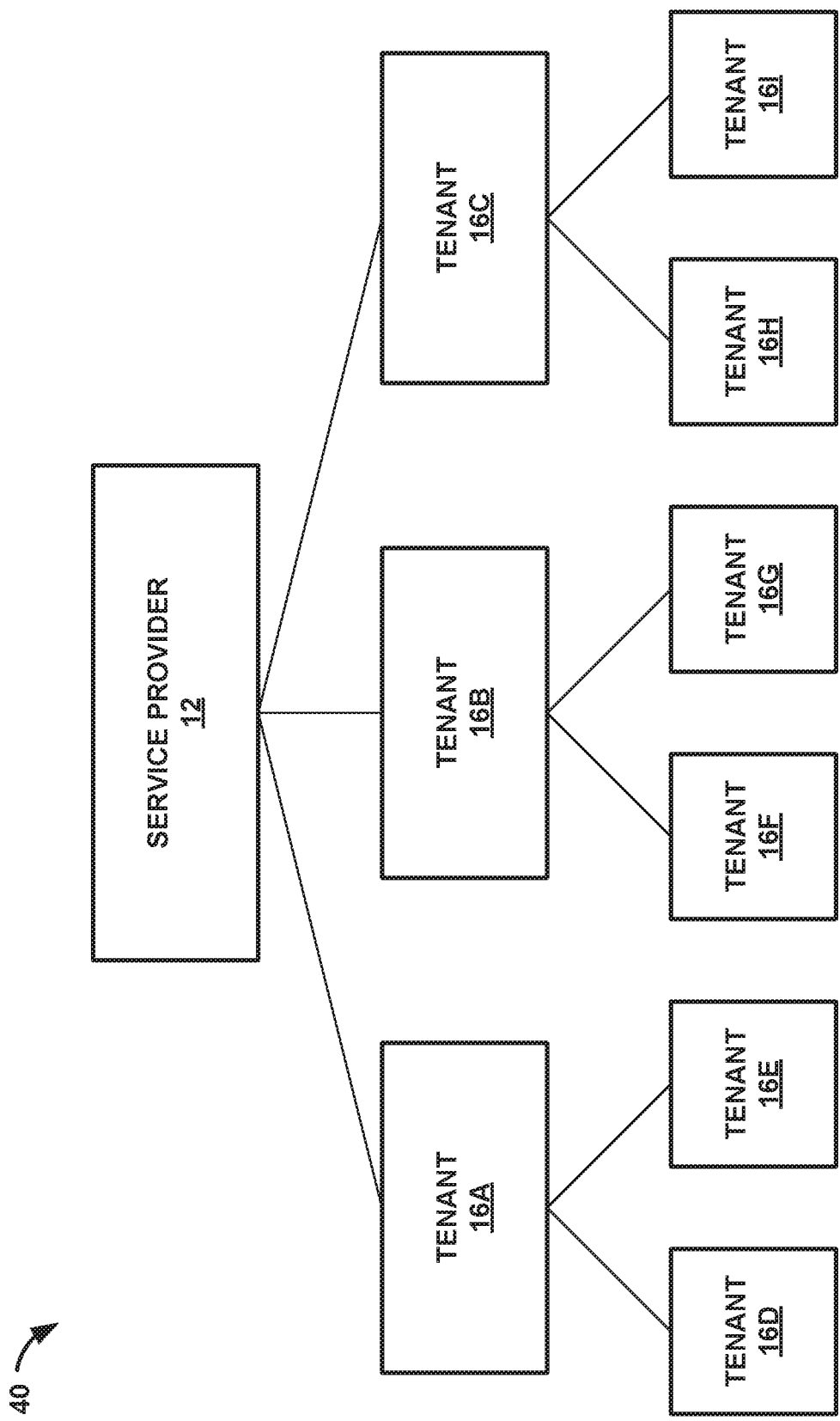
FIG. 2 is a block diagram illustrating a hierarchy of a service provider a set of tenants, in accordance with one or more techniques described herein.

Further details relating to aspects of this disclosure and techniques described herein are available in U.S. patent application Ser. No. 16/235,739, filed Dec. 28, 2018, entitled "CREATING ROLES AND CONTROLLING ACCESS WITHIN A COMPUTER NETWORK," the entire content of which is incorporated herein by reference. Additionally, further details relating to aspects of this disclosure and techniques described herein are available in U.S. patent application Ser. No. 16/235,647, filed Dec. 28, 2018, entitled "DYNAMIC PROVISIONING OF USER GROUPS WITHIN COMPUTER NETWORKS BASED ON USER ATTRIBUTES," the entire content of which is incorporated herein by reference, FIG. 2 is a block diagram illustrating a hierarchy 40 of service provider 12 and tenants 16 (entities 12, 16), in accordance with one or more techniques described herein. As seen in FIG. 2, hierarchy 40 may represent a "tree" where some of entities 12, 16 may descend from other entities of entities 12, 16 and some entities 12, 16 may be ancestors of other entities of entities 12, 16. In some examples, entities that are "higher" on hierarchy 40 (e.g., more descendant entities and less ancestor entities) may have more privileges in service provider network 2 than entities that are "lower" on hierarchy 40. In some examples, service provider 12 represents a first generation of hierarchy 40. In some examples, tenant 16A, tenant 16B, and tenant 16C represent a second generation of hierarchy 40. Additionally, in some examples, tenant 16D, tenant 16E, tenant 16F, tenant 16G, tenant 16H, and tenant 16I represent a third generation of hierarchy 40.

An entity of entities 12, 16 may be described herein as "parent entities," "child entities," "descendant entities," and "ancestor entities" relative to other entities of hierarchy 40. A parent entity may be a first-level ancestor of an entity in question. For example, service provider 12 is a parent entity of tenant 16A. A child entity may be a first-level descendant of an entity in question. For example, tenant 16G is a child entity of tenant 16B. A descendant entity may represent any level of descendant from an entity in question. For example, tenant 16E may represent a descendant entity of service provider 12. However, tenant 16E might not represent a child entity of service provider 12, since tenant 16E is a second-level descendant of service provider 12 rather than a first-level descendant. An ancestor entity may represent any level of ancestor to an entity in question. For example, service provider 12 may be an ancestor entity to tenant 16F, since service provider 12 is a second-level ancestor of tenant 16F. However, service provider 12 might not represent a parent entity of tenant 16F, since service provider 12 is not a first-level ancestor of tenant 16F.

In some examples, controller 20 may store a representation of hierarchy 40 in storage device 22. For example, controller 20 may use Kubernetes domains and Kubernetes projects to record relationships between parent entities, child entities, ancestor entities, and descendant entities. A Kubernetes domain may have one or more dependent Kubernetes projects. In turn, a Kubernetes project may have one or more additional dependent Kubernetes projects. In this way, if a tenant (e.g., tenant 16I) joins service provider network 2, controller 20 may create a Kubernetes project representing tenant 16I depending from another Kubernetes project representing tenant 16C, the parent entity of tenant 16I.

Hierarchy 40 may represent a multi-tenancy framework in which access to microservices (e.g., objects 30) may be restricted based on hierarchy 40. For example, service provider 12 may output a message to controller 20, the message indicating a request to create an object and generate a rule corresponding to the object based on a set of parameters. Service provider 12 may provide the set of parameters to controller 20 so that controller 20 may generate the rule. In some examples, the set of parameters includes an indication of a subset of entities of entities of entities 12, 16 that are permitted access to the object. In some examples, the indication of the subset of entities may include an indication that child entities (i.e., tenants 16A-16C) of service provider 12 are permitted access to the object. In some such examples, tenants 16D-16I are not permitted access to the object, since tenants 16D-16I are second-level descendant entities of service provider 12 and are therefore not child entities of service provider 12. Additionally, in some examples, the indication of the subset of entities may include an indication that all descendant entities (i.e., tenants 16A-16I) of service provider 12 are permitted access to the object.

In some examples, tenant 16D may output a message to controller 20, the message indicating a request to create an object and generate a rule corresponding to the object based on a set of parameters. Tenant 16D may provide the set of parameters to controller 20 so that controller 20 may generate the rule. In some examples, the set of parameters includes an indication of a subset of entities of entities of entities 12, 16 that are permitted access to the object. In some examples, the indication of the subset of entities may include an indication that the parent entity (i.e., tenant 16A) of tenant 16D is permitted access to the object. In some such examples, service provider 12 is not permitted access to the object, since service provider 12 is a second-level ancestor entity of tenant 16D, and is therefore not the parent entity of tenant 16D. Additionally, in some examples, the indication of the subset of entities may include an indication that all ancestor entities (i.e., tenant 16A and service provider 12) of tenant 16D are permitted access to the object.

Although FIG. 2 illustrates hierarchy 40 as including three levels of entities, in other examples not illustrated in FIG. 2, hierarchy 40 may include more than three levels or less than three levels of entities. Additionally, entities in hierarchy 40 are not meant to be limited to a certain number of child entities. An entity may have any number of child entities.

Figure 3:
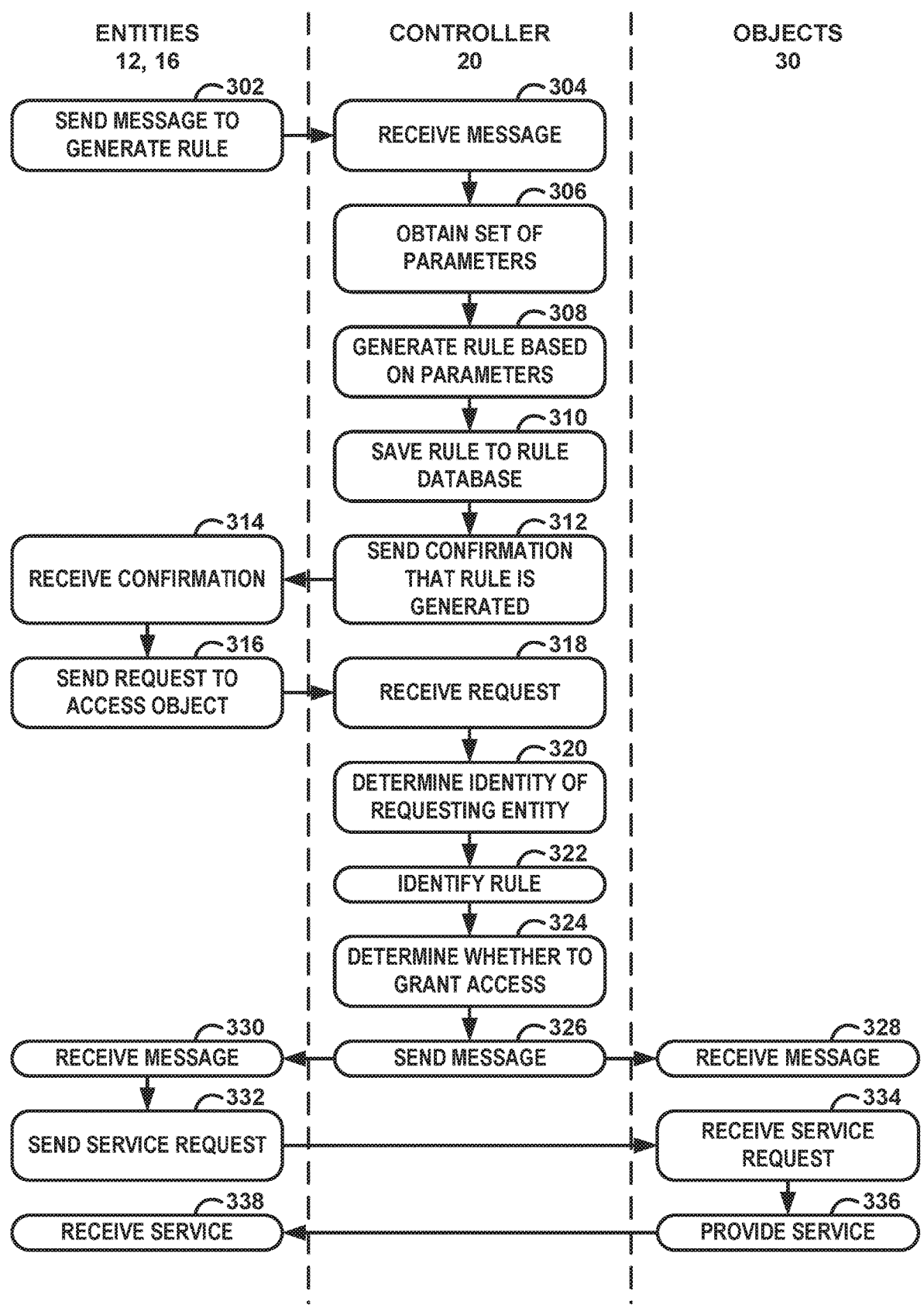
FIG. 3 is a flow diagram illustrating an example operation for generating a rule to govern access to an object and controlling access to the object, in accordance with one or more techniques of this disclosure.

FIG. 3 is a flow diagram illustrating an example operation for generating a rule to govern access to an object and/or controlling access to the object, in accordance with one or more techniques of this disclosure. For convenience, FIG. 3 is described with respect to entities 12, 16, controller 20, and objects 30 of FIG. 1. However, the techniques of FIG. 3 may be performed by different components of entities 12, 16, controller 20, and objects 30 or by additional or alternative devices.

An entity of entities 12, 16 (e.g., tenant 16A) sends a message to generate a rule (302) to controller 20. In some examples, the message to generate the rule is associated with a request to generate the rule to govern access to an object of objects 30 (e.g., object 30A). Additionally, in some examples, tenant 16A may represent an owner entity corresponding to object 30A. Controller 20 may receive the message (304) in response to receiving the message to generate the rule, controller 20 may obtain a set of parameters (306), the set of parameters being associated with the owner entity, tenant 16A. In some examples, the set of parameters includes an indication of the owner entity (i.e., an indication that tenant 16A is the owner entity), an indication of a level of access to the object available to tenant 16A, an indication to share object 30A with at least one subset of entities of entities 12, 16, and an indication of whether to share object 30A with all entities of the set of entities. Based on the set of parameters, controller 20 is configured to generate the rule (308) to facilitate controlling access to object 30A. Controller 20 saves the rule to a rule database (310) stored in storage device 22. In some examples, the rule database includes a rule corresponding to each object of objects 30. In this way, the rule database may be consulted by controller 20 to control access to objects 30. Controller 20 sends a confirmation that the rule is generated (312) and entities 12, 16 receives the confirmation (314).

After the rule has been created enabling controller 20 to control access to object 30A, entities 12, 16 may request to access object 30A and controller 20 may determine whether a requesting entity is permitted to access object 30A. For example, an entity such as tenant 16D of FIG. 2 may send a request to access object 30A to controller 20 (316). Controller 20 may receive the request (318) and determine an identity of a requesting entity (320) based on the request. For example, controller 20 may determine that tenant 16D sent the request to access object 30A. Subsequently, controller 20 identifies the rule (322) in the rule database stored in storage device 22 that corresponds to object 30A. In some cases, the rule may include an indicator that the rule corresponds to object 30A so that controller 20 can identify the rule corresponding to object 30A. Based on the rule, controller 20 may determine whether to grant the requesting entity access (324) to object 30A. Since controller 20 may determine that tenant 16D is the requesting entity in block 320, controller 20 may cross-reference permitted entities included in the rule with the identity of tenant 16D to determine whether tenant 16D is permitted access to object 30A. Subsequently, controller 20 may send a message (326) indicating that controller 20 the determination of whether to grant tenant 16A access to object 30A is made. Object 30A may receive the message (328) and entities 12, 16 may receive the message (330). Tenant 16D may send a service request (332) to object 30A. Object 30A may receive the service request (334). If the message received by object 30A includes an indication that tenant 16D is permitted access to object 30A, object 30A may provide a service (336) to tenant 16D and tenant 16D may receive the service (338).

FIG. 4 is a flow diagram illustrating an example operation for creating or generating a project corresponding to an entity of entities 12, 16, in accordance with one or more techniques of this disclosure. For convenience, FIG. 4 is described with respect to entities 12, 16, controller 20, storage device 22, processing unit 24, API server 26, and objects 30 of FIG. 1. However, the techniques of FIG. 4 may be performed by different components of entities 12, 16, controller 20, storage device 22, processing unit 24, API server 26, and objects 30 or by additional or alternative devices.

API server 26 may output an HTTP POST message to processing unit 24 (402), the POST message including a name of the project to be generated and a name of the parent project of the project to be generated. Subsequently, processing unit 24 may generate the project. Processing unit 24 may output a message to API server 26 including an identification of the project; an identification of the parent project; and an identification of all ancestor projects of the newly created project (404), API server 26 may output a POST message to storage device 22 to store the newly created project in a project database (406), the Post message including a fully qualified name of the project (fq_name), a universally unique identifier (UUID) of the newly generated project, and a QUID of the parent project. Storage device 22 may return a message including a uuid of the newly generated project (408) in order to confirm that the project is stored in the project database. In some examples, processing unit 24 may generate projects in order to maintain a representation of the hierarchy of entities 12, 16 such that controller 20 may control access to objects 30 based on the hierarchy.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory, media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a network managed by a service provider and configured to provide access to one or more objects to a set of tenants each having one or more users, the service provider and the set of tenants being part of a set of entities that form a hierarchy of a multi-tenancy framework, wherein each entity of the set of entities that form the hierarchy is associated with at least one of a parent entity of the set of entities and one or more child entities of the set of entities, wherein each object of the one or more objects comprises a set of data that is accessible to one or more subsets of entities of the set of entities, and wherein the set of entities is separate from the one or more objects; and
a controller comprising processing circuitry and having access to the network, wherein the processing circuitry is configured to:
obtain data indicative of a set of parameters, wherein the data indicative of the set of parameters is associated with an owner entity of the set of entities, wherein the set of parameters includes an indication to share an object of the one or more objects created by the owner entity with a respective one or more subsets of entities of the set of entities, and wherein the set of parameters including the indication to share the object define the respective one or more subsets of entities based on the hierarchy such that the set of parameters define a set of relationships corresponding to each subset of entities of the one or more subsets of entities, and wherein the set of relationships corresponding to each subset of entities of the one or more subsets of entities indicate how the entities of the subset of entities are connected to each other within the hierarchy of the multi-tenancy framework,
generate a rule which incorporates the set of parameters and the set of relationships corresponding to each subset of entities of the one or more subsets of entities, wherein the rule enables the processing circuitry to control access of the set of entities to an object of the one or more objects based on the one or more subsets of entities shared with the object, and
add the rule to a rules database, wherein the rules database is accessible to the controller.

2. The system of claim 1, wherein the processing circuitry is configured to:
receive, from a requesting entity of the set of entities, a token requesting access to the object, wherein the token includes data indicative of an identity of the requesting entity;
identify, based on information stored in the rules database, the rule corresponding to the object; and
determine, based on the set of parameters incorporated by the rule and based on the identity of the requesting entity, whether the requesting entity is granted access to the object.

3. The system of claim 2, wherein to determine whether the requesting entity is granted access to the object, the processing circuitry is configured to:
determine that the requesting entity is granted access to the object if the requesting entity is included by the at least one subset of entities; or determine that the requesting entity is not granted access to the object if the requesting entity is not included by the at least one subset of entities.

4. The system of claim 2, wherein the set of parameters comprises:
an indication of the owner entity associated with the rule;
an indication of a level of access to the object available to the owner entity;
the indication to share the object corresponding to the rule with the at least one subset of entities of the set of entities; and
an indication of whether to share the object with all entities of the set of entities.

5. The system of claim 4, wherein to determine whether the requesting entity is granted access to the object, the processing circuitry is configured to:
determine, if the requesting entity is not the owner entity, that the requesting entity is granted access to the object if the requesting entity is included by the at least one subset of entities or if the set of parameters comprises an indication to share the object with all entities of the set of entities; or
determine, if the requesting entity is not the owner entity, that the requesting entity is not granted access to the object if the requesting entity is not included by the at least one subset of entities and if the set of parameters comprises an indication not to share the object with all entities of the set of entities.

6. The system of claim 4, wherein to determine whether the requesting entity is granted access to the object, the processing circuitry is configured to:
determine, if the requesting entity is the owner entity, whether the requesting entity is granted access to the object based on the indication of the level of access to the object available to the owner entity.

7. The system of claim 4, wherein the indication of the level of access to the object available to the owner entity comprises:
an indication that the owner entity is permitted to read the object, wherein the indication that the owner entity is permitted to read the object enables the owner entity to view data associated with the object;
an indication that the owner entity is permitted to write the object, wherein the indication that the owner entity is permitted to write the object enables the owner entity to edit the data associated with the object;
an indication that the owner entity is permitted to execute the object, wherein the indication that the owner entity is permitted to execute the object enables the owner entity to receive a service associated with the object;
an indication that the owner entity is permitted to read the object and write the object;
an indication that the owner entity is permitted to read the object and execute the object;
an indication that the owner entity is permitted to write the object and execute the object;

an indication that the owner entity is permitted to read the object, write the object, and execute the object; or an indication that the owner entity is not permitted to read the object, write the object, and execute the object.

8. The system of claim 4, wherein the indication to share the object with the at least one subset of entities of the set of entities comprises at least one of:

an indication to share the object with a subset of entities including a direct parent entity associated with the owner entity;

an indication to share the object with a subset of entities including one or more direct child entities associated with the owner entity;

an indication to share the object with a subset of entities including all entities of the set of entities that descend from the owner entity in the hierarchy; and an indication to share the object with a subset of entities including all ancestor entities of the set of entities that precede the owner entity in the hierarchy.

9. The system of claim 4, wherein each entity of the set of entities is associated with a respective scope of a set of scopes, and wherein the indication to share the object with the at least one subset of entities of the set of entities comprises:

an indication to share the object with a subset of entities including all entities to the set of entities that are associated with a scope of the set of scopes.

10. The system of claim 1, wherein the processing circuitry is further configured to:

receive, from a creating entity of the set of entities that form the hierarchy and via an application programming interface (API), a message indicative of a request to create a new entity;

create, based on the message, the new entity such that a parent entity of the new entity is the creating entity and a child entity of the creating entity is the new entity; and output a message to the API which includes an indication of an identity of the new entity and an indication of an identity of the parent entity of the new entity.

11. The system of claim 10, wherein the system further includes the API and a storage device, and wherein the API is configured to:

receive the message which includes the indication of the identity of the new entity and the indication of the identity of the parent entity of the new identity;

send, in response to receiving the message which includes the indication of the identity of the new entity and the indication of the identity of the parent entity of the new identity, a message instructing the storage device to save the new entity in a hierarchy database; and receive, from the storage device, a confirmation that the new entity is saved to the hierarchy database.

12. A method comprising:

obtaining, by processing circuitry of a controller having access to a network, data indicative of a set of parameters, wherein the network is managed by a service provider and configured to provide access to one or more objects to a set of tenants each having one or more users, the service provider and the set of tenants being part of a set of entities that form a hierarchy of a multi-tenancy framework, wherein each entity of the set of entities that form the hierarchy is associated with at least one of a parent entity of the set of entities and one or more child entities of the set of entities, wherein each object of the one or more objects comprises a set of data that is accessible to one or more subsets of entities of the set of entities, and wherein the set of entities is separate from the one or more objects, wherein the data indicative of the set of parameters is associated with an owner entity of the set of entities, wherein the set of parameters includes an indication to share an object of the one or more objects created by the owner entity with a respective one or more subsets of entities of the set of entities, and wherein the set of parameters including the indication to share the object define the respective one or more subsets of entities based on the hierarchy such that the set of parameters define a set of relationships corresponding to each subset of entities of the one or more subsets of entities, and wherein the set of relationships corresponding to each subset of entities of the one or more subsets of entities indicate how the entities of the subset of entities are connected to each other within the hierarchy of the multi-tenancy framework;

generating a rule which incorporates the set of parameters and the set of relationships corresponding to each subset of entities of the one or more subsets of entities, wherein the rule enables the processing circuitry to control access of the set of entities to an object of the one or more objects based on the one or more subsets of entities shared with the object; and adding the rule to a rules database, wherein the rules database is accessible to the controller.

13. The method of claim 12, further comprising:

receiving, from a requesting entity of the set of entities, a token requesting access to the object, wherein the token includes data indicative of an identity of the requesting entity;

identifying, based on information stored in the rules database, the rule corresponding to the object; and determining, based on the set of parameters incorporated by the rule and based on the identity of the requesting entity, whether the requesting entity is granted access to the object.

14. The system of claim 13, wherein determining whether the requesting entity is granted access to the object comprises:

determining that the requesting entity is granted access to the object if the requesting entity is included by the at least one subset of entities; or determining that the requesting entity is not granted access to the object if the requesting entity is not included by the at least one subset of entities.

15. The method of claim 13, wherein the set of parameters comprises:

an indication of the owner entity associated with the rule;

an indication of a level of access to the object available to the owner entity;

the indication to share the object corresponding to the rule with the at least one subset of entities of the set of entities; and an indication of whether to share the object with all entities of the set of entities.

16. The method of claim 15, wherein determining whether the requesting entity is granted access to the object comprises:

determining, if the requesting entity is not the owner entity, that the requesting entity is granted access to the object if the requesting entity is included by the at least one subset of entities or if the set of parameters comprises an indication to share the object with all entities of the set of entities; or determining, if the requesting entity is not the owner entity, that the requesting entity is not granted access to the object if the requesting entity is not included by the at least one subset of entities and if the set of parameters comprises an indication not to share the object with all entities of the set of entities.

17. The method of claim 15, wherein determining whether the requesting entity is granted access to the object comprises:
determining, if the requesting entity is the owner entity, whether the requesting entity is granted access to the object based on the indication of the level of access to the object available to the owner entity.

18. The method of claim 12, further comprising:
receiving, from a creating entity of the set of entities that form the hierarchy and via an application programming interface (API), a message indicative of a request to create a new entity;
creating, based on the message, the new entity such that a parent entity of the new entity is the creating entity and a child entity of the creating entity is the new entity; and
outputting a message to the API which includes an indication of an identity of the new entity and an indication of an identity of the parent entity of the new entity.

19. The method of claim 18, wherein the system further includes the API and a storage device, and wherein method further comprises:
receiving, by the API, the message which includes the indication of the identity of the new entity and the indication of the identity of the parent entity of the new identity;
sending, by the API and in response to receiving the message which includes the indication of the identity of the new entity and the indication of the identity of the parent entity of the new identity, a message instructing the storage device to save the new entity in a hierarchy database; and
receiving, by the API and from the storage device, a confirmation that the new entity is saved to the hierarchy database.

20. A non-transitory computer-readable medium comprising instructions for causing processing circuitry to:
obtain data indicative of a set of parameters, wherein the network is managed by a service provider and configured to provide access to one or more objects to a set of tenants each having one or more users, the service provider and the set of tenants being part of a set of entities that form a hierarchy of a multi-tenancy framework, wherein each entity of the set of entities that form the hierarchy is associated with at least one of a parent entity of the set of entities and one or more child entities of the set of entities, wherein each object of the one or more objects comprises a set of data that is accessible to one or more subsets of entities of the set of entities, and wherein the set of entities is separate from the one or more objects, wherein the data indicative of the set of parameters is associated with an owner entity of the set of entities, wherein the set of parameters includes an indication to share an object of the one or more objects created by the owner entity with a respective one or more subsets of entities of the set of entities, and wherein the set of parameters including the indication to share the object define the respective one or more subsets of entities based on the hierarchy such that the set of parameters define a set of relationships corresponding to each subset of entities of the one or more subsets of entities, and wherein the set of relationships corresponding to each subset of entities of the one or more subsets of entities indicate how the entities of the subset of entities are connected to each other within the hierarchy of the multi-tenancy framework;
generate a rule which incorporates the set of parameters and the set of relationships corresponding to each subset of entities of the one or more subsets of entities, wherein the rule enables a controller to control access of the set of entities to an object of the one or more objects based on the one or more subsets of entities shared with the object; and
add the rule to a rules database, wherein the rules database is accessible to the controller.

* * * * *